(12) United States Patent
Snyder et al.

(10) Patent No.: US 9,873,522 B2
(45) Date of Patent: Jan. 23, 2018

(54) AIRCRAFT HAIL SCREEN

(71) Applicant: United Technologies Corporation, Hartford, CT (US)

(72) Inventors: Ryan K. Snyder, Glastonbury, CT (US); Eric J. Heims, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 92 days.

(21) Appl. No.: 14/866,119

(22) Filed: Sep. 25, 2015

(65) Prior Publication Data

US 2016/0090190 A1 Mar. 31, 2016

Related U.S. Application Data

(60) Provisional application No. 62/055,318, filed on Sep. 25, 2014.

(51) Int. Cl.
| | |
|---|---|
| *B01D 41/00* | (2006.01) |
| *B64D 45/00* | (2006.01) |
| *F02K 3/115* | (2006.01) |
| *F02C 7/055* | (2006.01) |
| *F02C 7/14* | (2006.01) |
| *B64D 33/08* | (2006.01) |
| *F02C 7/052* | (2006.01) |
| *F02C 7/05* | (2006.01) |

(Continued)

(52) U.S. Cl.
CPC ............. *B64D 45/00* (2013.01); *B64D 33/08* (2013.01); *F02C 7/055* (2013.01); *F02C 7/14* (2013.01); *F02K 3/115* (2013.01); *B01D 46/10* (2013.01); *B01D 2273/10* (2013.01); *B01D 2279/60* (2013.01); *B64D 33/02* (2013.01); *F02C 7/05* (2013.01); *F02C 7/052* (2013.01); *F05D 2260/213* (2013.01); *F05D 2260/607* (2013.01); *F05D 2260/98* (2013.01); *Y02T 50/671* (2013.01); *Y02T 50/675* (2013.01)

(58) Field of Classification Search
CPC ........ B64D 45/00; B64D 33/08; B64D 33/00; F02C 7/055; F02C 7/14; F02C 7/052; F02C 7/05; F02K 3/115; Y02T 50/675; Y02T 50/671; B01D 2273/10; B01D 46/10; F05D 2260/98; F05D 2260/213; F05D 2260/607
See application file for complete search history.

(56) References Cited

U.S. PATENT DOCUMENTS

| | | |
|---|---|---|
| 2,575,415 A | 11/1951 | Grimac |
| 2,931,460 A | 4/1960 | Benjamin |

(Continued)

FOREIGN PATENT DOCUMENTS

DE 2212708 9/1973

OTHER PUBLICATIONS

EP search report for EP15186762 dated Feb. 15, 2016.

(Continued)

*Primary Examiner* — Dung H Bui
(74) *Attorney, Agent, or Firm* — O'Shea Getz P.C.

(57) ABSTRACT

Aspects of the disclosure are directed to a screen configured for use in association with a cooler of an aircraft, the screen comprising: a first portion arranged as a grid and located in a line-of-sight of the cooler with respect to a fluid inlet, and a second portion located out of the line-of-sight of the cooler with respect to the fluid inlet, wherein the second portion is grid-free.

8 Claims, 3 Drawing Sheets

(51) Int. Cl.
B64D 33/02 (2006.01)
B01D 46/10 (2006.01)

(56) References Cited

U.S. PATENT DOCUMENTS

| | | | |
|---|---|---|---|
| 2,944,731 A | | 7/1960 | Kastan |
| 3,121,545 A | | 2/1964 | Meletion |
| 3,329,377 A | | 7/1967 | Peterson |
| 3,338,049 A | | 8/1967 | Fernberger |
| 4,456,458 A | | 6/1984 | Gilbertson |
| 4,617,028 A | | 10/1986 | Ray |
| 5,139,545 A | | 8/1992 | Mann |
| 5,286,071 A | * | 2/1994 | Storage .................. F16L 27/04 285/226 |
| 7,021,054 B2 | | 4/2006 | Alderson |
| 2008/0038880 A1 | | 10/2008 | Yoshida et al. |
| 2008/0257160 A1 | | 10/2008 | Yoshida et al. |
| 2008/0277526 A1 | | 11/2008 | Willdig |
| 2009/0038880 A1 | | 2/2009 | Asada et al. |
| 2015/0291288 A1 | * | 10/2015 | Bofill .................... B64D 33/02 244/53 B |
| 2016/0090190 A1 | * | 3/2016 | Snyder .................. F02K 3/115 55/385.1 |

OTHER PUBLICATIONS

"Safety and Airworthiness Verification of Civil Aircraft Engines", Journal of Mechanical Engineering and Technology, vol. 1 Iss. 3, pp. 92-115, Dec. 2013.

* cited by examiner

AIRCRAFT HAIL SCREEN

This application claims priority to U.S. Patent Appln. No. 62/055,318 filed Sep. 25, 2014.

BACKGROUND

Within an aircraft, an oil system is frequently used. Oil is used for cooling and lubricating various aircraft entities, such as rotating shaft bearings, a fan drive gear system, and a gearbox, where the gearbox extracts power from an engine for purposes of driving generators, pumps, and auxiliary components/devices. The oil system includes a tank for storing bulk oil and pipes that connect the tank to the various entities that require the oil.

A cooler may be used to remove heat from the oil. An air-oil cooler uses air for purposes of providing a cooling fluid. For example, air is taken from the fan bypass, flowed through the cooler, and returned to the fan bypass as an exhaust.

Foils located in the cooler are fragile, such that the foils are susceptible to damage if subjected to a direct impact from large objects (e.g., hail stones). Measures need to be taken to ensure that the foils are not damaged; otherwise, the reliability and availability of the aircraft may be compromised.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a screen configured for use in association with a cooler of an aircraft, the screen comprising: a first portion arranged as a grid and located in a line-of-sight of the cooler with respect to a fluid inlet, and a second portion located out of the line-of-sight of the cooler with respect to the fluid inlet, wherein the second portion is grid-free. In some embodiments, the dimensions of the grid of the first portion are configured to enable the screen to withstand a hail stone striking the screen. In some embodiments, the grid of the first portion is composed of segments, and each segment measures approximately 0.04 inches or 0.10 centimeters across and/or 0.38 inches or 0.97 centimeters in terms of depth. In some embodiments, the screen is configured to be mounted between a bellows seal coupled to the fluid inlet and an inlet duct coupled to the cooler. In some embodiments, the screen comprises a flange, and the flange comprises holes configured for mounting the screen. In some embodiments, the grid of the first portion is shaped as one of a square and a rectangle.

Aspects of the disclosure are directed to a system for an aircraft comprising: a fluid inlet, a screen coupled to the fluid inlet, and a cooler coupled to the screen, wherein the screen comprises: a first portion arranged as a grid and located in a line-of-sight of the cooler with respect to the fluid inlet, and a second portion located out of the line-of-sight of the cooler with respect to the fluid inlet, wherein the second portion is grid-free. In some embodiments, the fluid inlet is configured to receive air from a fan, and wherein the cooler is configured to remove heat from a fluid using the air. In some embodiments, the dimensions of the grid of the first portion are configured to enable the screen to withstand a hail stone striking the screen. In some embodiments, the grid of the first portion is composed of metal segments, wherein each segment measures approximately 0.04 inches or 0.10 centimeters across and/or approximately 0.38 inches or 0.97 centimeters in terms of depth. In some embodiments, the system further comprises: a bellows seal coupled to the fluid inlet, and an inlet duct coupled to the cooler, wherein the screen is configured to be mounted between the bellows seal and the inlet duct. In some embodiments, the screen comprises a flange, wherein the flange comprises bolt holes configured for mounting the screen.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
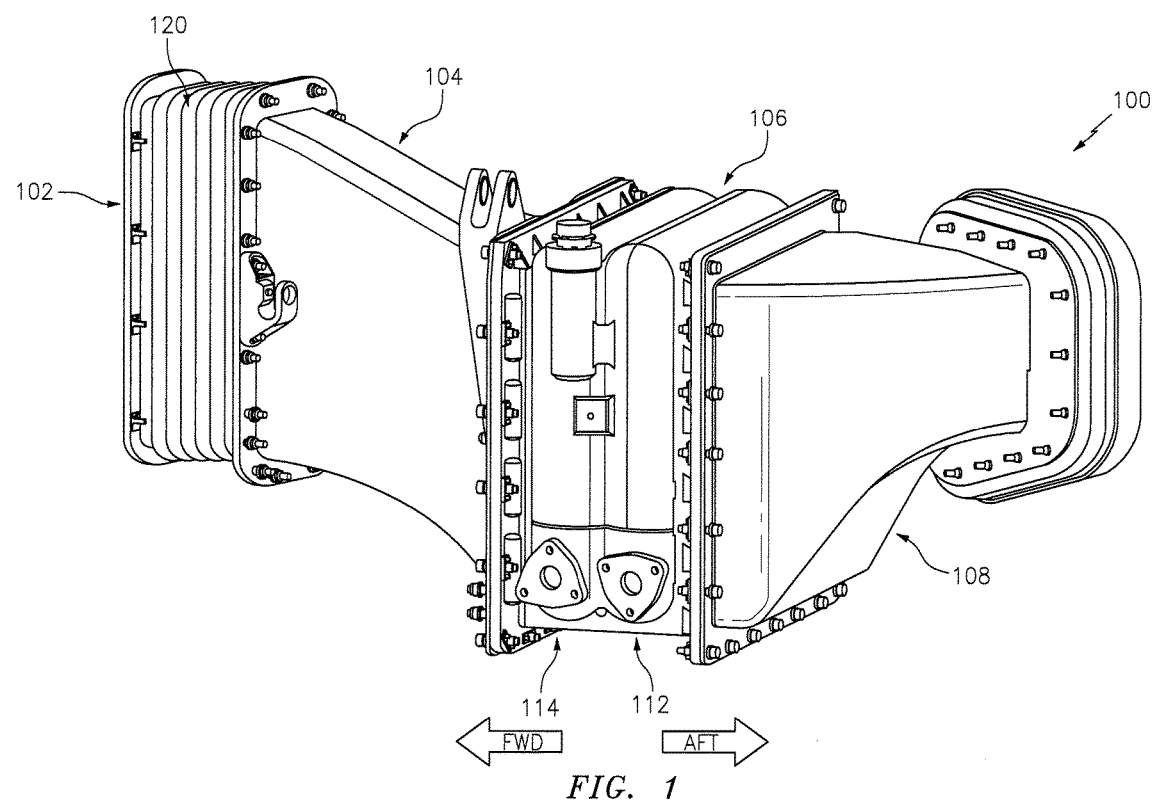
FIG. 1 illustrates an air-oil cooler system incorporating a hail screen.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a hail screen. In some embodiments, a hail screen is designed and manufactured to minimize/reduce a flow area blockage in order to minimize/reduce losses resulting from its inclusion. The hail screen may be designed to have a minimal weight. An area/portion of the hail screen that includes a mesh/grid may correspond to an area/portion that is in a line-of-sight with respect to a cooler (e.g., an air-oil cooler) and/or a fluid inlet (e.g., an air inlet) to minimize flow blockage. The hail screen may include an attachment flange that can easily be inserted into a flange stack within the compression capability of an inlet bellows seal.

Referring to FIG. 1, a system 100 is shown. The system 100 may be included as part of a larger system. For example, the system 100 may be included in, or associated with, an engine of an aircraft.

The system 100 includes an inlet 102. The inlet may be used to receive a cooling fluid, such as air. The air may include a free stream air. Alternatively or additionally, the inlet 102 may include a fan air inlet that receives air from a fan in the event that air is used as the cooling fluid.

The inlet 102 is coupled to an inlet duct 104. The inlet duct 104 is coupled to a cooler 106 that uses the cooling fluid (e.g., air) to remove heat from a secondary fluid (e.g., oil, hydraulic fluid, air, fuel, etc.). The air is removed from the system via an exhaust duct 108 coupled to the air-oil cooler 106.

The system 100 includes an oil inlet/input port 112 and an oil outlet/output port 114. Within the system 100, oil may be contained in a matrix of small diameter tubes (or plates) with cooling fins. Air may flow through the space between these tubes and absorb the heat as the air washes over the surface of the tubes and fins.

The orientation of the system 100 relative to the orientation of the aircraft is reflected via the forward (FWD) and aft (AFT) arrows.

The system 100 may be used to support any type of heat exchanger. The heat exchange relationship could involve fluids/materials of any type, such as fuel, oil, air, etc.

While the system 100 may be utilized/deployed in connection with a cooler in a bypass flow, aspects of the disclosure may be used in other environments or contexts. For example, one or more portions of the system 100 may be mounted to a pylon, a pre-cooler, or a fan case and ducted from a fan inlet cowl.

Figure 2:
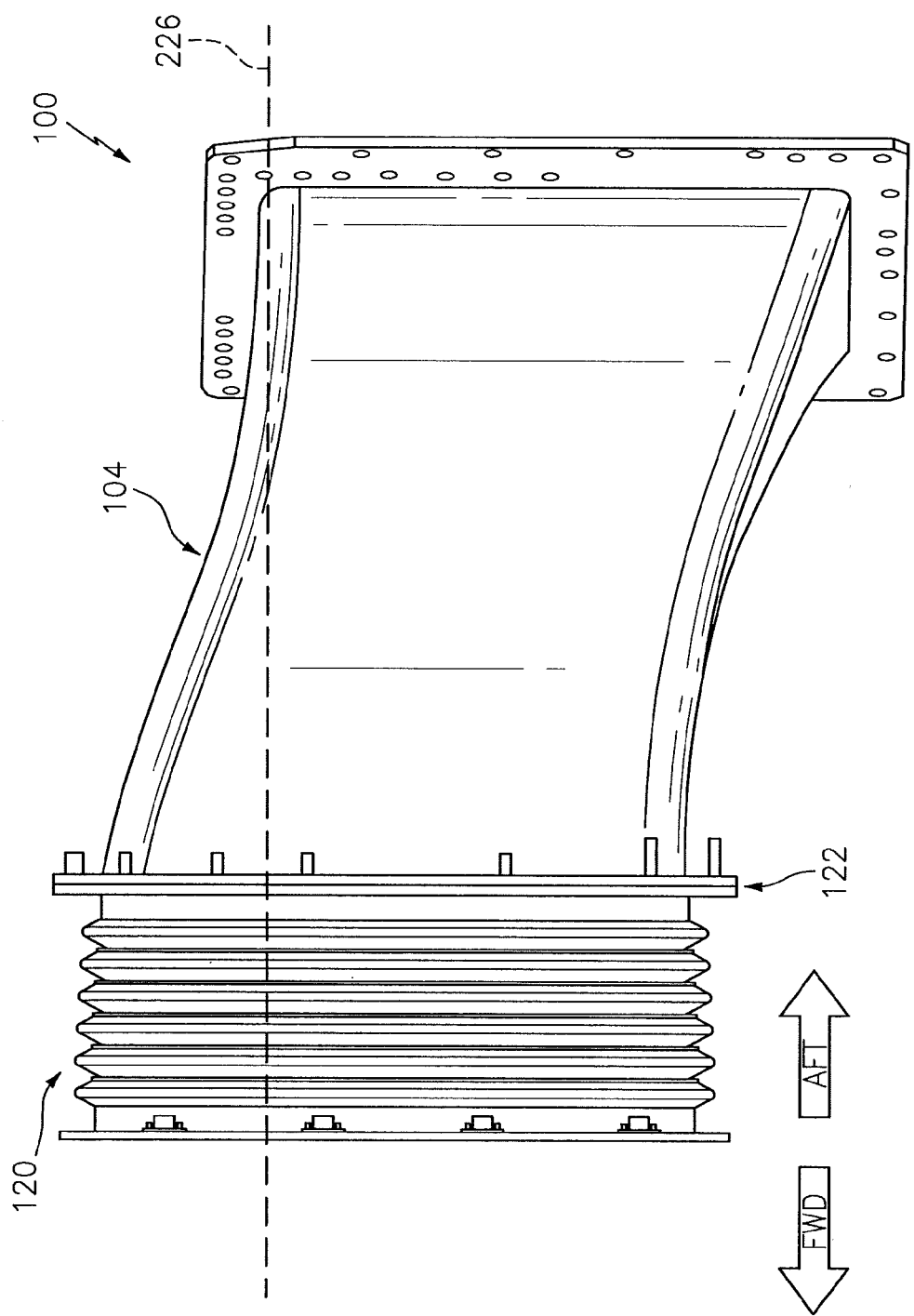
FIG. 2 illustrates a portion of the system of FIG. 1.

Referring to FIGS. 1-2, coupling the inlet 102 and the inlet duct 104 to one another are an inlet bellows seal 120 and a hail screen 122. As shown in FIG. 2, the bellows seal 120 is compressible, such that the hail screen 122 may be inserted/mounted between the bellows seal 120 and the inlet duct 104. In this respect, the hail screen 122 may be added to preexisting/legacy platforms/configurations/systems that otherwise did not provision for hail stone protection. The hail screen 122 may be made of one or more materials, such as one or more metals.

Referring to FIG. 2, a dashed reference line 226 is superimposed for purposes of illustration/description. Due to the shape of the inlet duct 104, or the relative positioning of the bellows seal 120 and the cooler 106, the portion of the hail screen 122 above the line 226 does not lie within a line-of-sight of the cooler 106. If a hail stone were to enter the inlet 102/bellows seal 120 at a position above the line 226, the hail stone would break apart or fragment upon contacting the upper edge/portion of the inlet duct 104. Accordingly, and as shown in FIGS. 3B-3C, a first portion/area 332 of the hail screen 122 below the line 226 may include a mesh/grid in order to provide hail stone protection due to being in the line-of-sight of the cooler 106, whereas a second portion/area 334 of the hail screen 122 above the line 226 might not include a mesh/grid (e.g., may be grid-free) so as to avoid restricting air flow unnecessarily due to being out of the line-of-sight of the cooler 106.

Figure 3C:
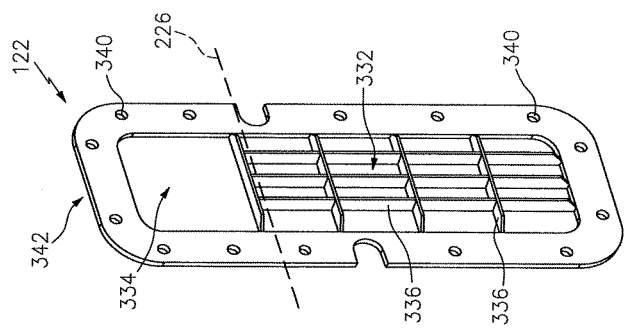
FIG. 3C illustrates a perspective view of a hail screen.
Figure 3B:
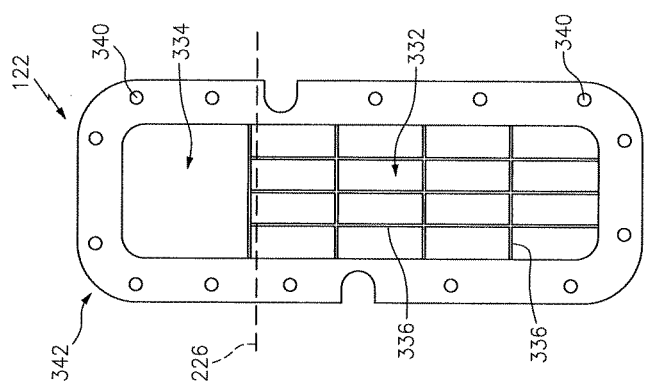
FIG. 3B illustrates a cross section of a hail screen.

Referring to FIG. 3B, the material (reflected via the segments 336) of the mesh/grid portion 332 may be sized to avoid restricting airflow unnecessarily while still providing the requisite hail stone protection. In some embodiments, the material (segments 336) may each measure approximately 0.04 inches or 0.10 centimeters across (e.g., each of the segments 336 of the grid/mesh may be approximately 0.10 centimeters thick in FIG. 3B). Similarly, the material (reflected via the segments 336) of the mesh/grid portion 332 in FIG. 3C may measure approximately 0.38 inches or 0.97 centimeters in terms of depth and may be selected to provide sufficient strength in the event of a hail stone striking the hail screen 122. Of course, the dimensions are illustrative and other dimensions may be used in the composition of the mesh/grid portion 332.

Figure 3A:
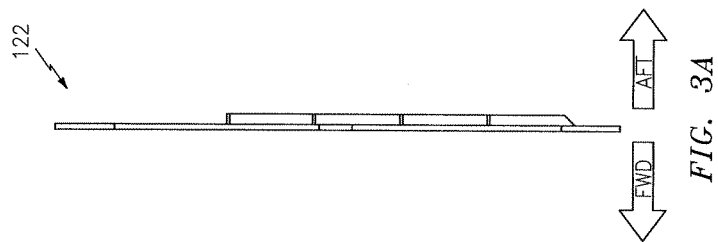
FIG. 3A is a side perspective view of a hail screen.

FIG. 3A provides a general sense of the depth/thickness of the hail screen 122. As described above, the hail screen 122 may be of relatively modest dimensions such that the hail screen 122 can be inserted/mounted between the bellows seal 120 and the inlet duct 104. As shown in FIGS. 3B-3C, the hail screen 122 may incorporate bolt holes 340 in a flange 342 to support such a mounting.

In FIGS. 3B-3C, the grid/mesh portion 332 is shown as being arranged using square/rectangular boxes or a square/rectangular geometry. Other geometries/shapes/patterns (e.g., triangles, circles, ovals, etc.) may be used for the grid in some embodiments.

While some of the examples were described above in connection with protecting against hail stones, one skilled in the art would appreciate that aspects of the disclosure may be applied/used to protect against damage from any type of foreign object. Furthermore, a screen in accordance with one or more aspects of the disclosure may be incorporated on one or more systems or platforms, such as one or more types of aircraft.

Technical effects and benefits of the disclosure include an enhancement in terms of safety/reliability of a cooler, and more specifically, foils located in the cooler. A hail screen of modest dimensions may be used to protect the foils without impacting surrounding/adjacent hardware and with a negligible impact on the performance of the cooler.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system for an aircraft engine, comprising:
   a fluid inlet;
   a bellows seal coupled to the fluid inlet;
   an inlet duct;
   a screen mounted between the bellows seal and the inlet duct; and
   a cooler coupled to the inlet duct,
   wherein the screen comprises:
      a first portion arranged as a grid and located in a line-of-sight of the cooler with respect to the fluid inlet;
      a second portion located out of the line-of-sight of the cooler with respect to the fluid inlet, wherein the second portion is grid-free; and
      a flange that comprises bolt holes for mounting the screen,
   wherein the line-of-sight is oriented axially with respect to an airflow through the engine.

2. The system of claim 1, wherein the fluid inlet receives air from a fan, and wherein the cooler removes heat from a fluid using the air.

3. The system of claim 1, wherein dimensions of the grid of the first portion enable the screen to withstand a hail stone striking the screen.

4. The system of claim 3, wherein the grid of the first portion is composed of metal segments, and wherein each segment measures approximately 0.04 inches across, and wherein each segment measures approximately 0.38 inches in terms of depth.

5. The system of claim 1, wherein the airflow is a bypass flow.

6. The system of claim 1, wherein the cooler is an air-oil cooler that removes heat from oil.

7. The system of claim 1, wherein the screen is mounted axially between the bellows seal and the inlet duct.

8. An inlet duct passage for an air cooler of a gas turbine engine, the duct passage comprising:
   a fluid inlet;
   a bellows seal coupled to the fluid inlet;

a duct including a duct inlet and a duct outlet;
a screen mounted between the bellows seal and the duct inlet;
the duct outlet coupled to the cooler;
the duct inlet having a duct inlet area through which air passes while traveling downstream to the cooler;
the duct outlet downstream of the duct inlet, the duct outlet having a duct outlet area through which air passes while traveling downstream to the cooler;
the duct inlet being flow-wise offset from the duct outlet so that a first portion of the duct inlet area is within a line of sight of the duct outlet area and a second portion of the duct inlet area is outside the line of site of the duct outlet area; and
the screen including a screen frame having a flange that includes bolt holes that complements the duct inlet area for fixedly connecting the screen to the duct inlet, wherein the screen comprises a screen filter extending only over the first portion of the duct inlet area.

\* \* \* \* \*